FIG. 1.

Sept. 16, 1958 R. F. WORLIDGE 2,852,280
SELF-ENGAGING AND SELF-SEALING PIPE COUPLINGS
ESPECIALLY APPLICABLE TO FLIGHT
REFUELLING PURPOSES
Filed April 29, 1955 8 Sheets-Sheet 3

Ronald F. Worlidge
INVENTOR
BY Watson, Cole, Grindle & Watson
ATTORNEYS

Sept. 16, 1958 R. F. WORLIDGE 2,852,280
SELF-ENGAGING AND SELF-SEALING PIPE COUPLINGS
ESPECIALLY APPLICABLE TO FLIGHT
REFUELLING PURPOSES
Filed April 29, 1955 8 Sheets-Sheet 5

Ronald F. Worlidge
INVENTOR
BY Watson, Cole, Grindle & Watson
ATTORNEYS

INVENTOR
Ronald F. Worlidge
BY Watson, Cole, Grindle & Watson
ATTORNEYS

Sept. 16, 1958 R. F. WORLIDGE 2,852,280
SELF-ENGAGING AND SELF-SEALING PIPE COUPLINGS
ESPECIALLY APPLICABLE TO FLIGHT
REFUELLING PURPOSES Filed April 29, 1955 8 Sheets-Sheet 8

SELF-ENGAGING AND SELF-SEALING PIPE COUPLINGS ESPECIALLY APPLICABLE TO FLIGHT REFUELLING PURPOSES

Ronald F. Worlidge, Lower Parkstone, England

Application April 29, 1955, Serial No. 504,927

Claims priority, application Great Britain September 7, 1954

5 Claims. (Cl. 284—18)

This invention relates to a self-engaging, self-sealing plug-and-socket type pipe-coupling assembly, of which the socket member has a throat adapted to receive the plug member, constituted by a nozzle, and is provided with spring-loaded latches adapted to engage the nozzle resiliently when the nozzle is thrust into the socket and to allow the nozzle and socket to be separated when subjected to a supercritical tension, and in which both the socket part and the nozzle are provided with spring-closed valves, which seal the openings of the socket part and the nozzle when disconnected, and are opened automatically when the nozzle is inserted in and engaged with the socket.

This application is a continuation-in-part of my co-pending application Serial No. 288,599, filed May 19, 1952, now United States Patent 2,733,079, granted January 31, 1956.

Such a pipe-coupling assembly, as well as having other possible applications, finds a useful application in flight-refuelling equipment for aircraft, one member of the assembly, usually the plug member, being installed on one aircraft in a forwardly facing position in a substantially rigid manner, and the other member being installed, preferably by means of a ball and socket joint, on the end of a flexible hose or the like trailed by another aircraft.

With such a pipe-coupling assembly it is desirable to prevent as far as is possible any spillage of fluid from the pipes which are to be connected by the coupling, either in the act of inserting the nozzle in the socket or when the nozzle is pulled out of the socket, especially if, as may occur, the latter action takes place unintentionally; and such spill-proof character is especially important in flight-refuelling installations, or any other installations handling inflammable liquids, on account of the fire hazard.

The general object of this invention is a pipe-coupling of the type first herein referred to having improved spill-proof characteristics, the valves being both fully automatic.

To achieve this aim it is essential to ensure firstly that on inserting the plug member or nozzle of the coupling assembly into the socket member an effective seal between these two members is obtained before either valve, i. e. that in the socket and that in the nozzle, can open, and conversely, that on withdrawal of the nozzle from the socket both valves close before the seal between the nozzle and socket is broken; and secondly, that the volume of any cavities, in which fluid can be trapped and from which it must inevitably be spilled on withdrawal of the nozzle from the socket, be as small as possible.

To meet these requirements, a particular object of this invention is a coupling assembly, which comprises a sleeve-like seal-carrier axially slidable in a fluid-tight manner in the socket and bearing an annular seal on which the extremity of the nozzle, when inserted into the socket, seats in a fluid-tight manner, such seal carrier also providing a seating facing towards the mouth of the socket for the axially slidable poppet valve of the socket, the seal-carrier and poppet valve being interconnected by a system of radially disposed levers fulcrumed intermediately of their ends on the body or shell of the socket with their inner ends operatively engaged with the poppet valve and their outer ends with the seal-carrier, so that displacement of the latter towards the interior of the socket unseats the poppet valve and displaces it towards the mouth of the socket, and the sub-assembly of seal-carrier, levers and poppet valve being spring-loaded to urge the seal-carrier towards the mouth of the socket and the poppet valve in the opposite sense towards its seating.

When the nozzle is inserted in the socket, it makes a fluid-tight joint on the annular seal of the seal carrier before it is fully inserted and latched into the socket, further advance of the nozzle to reach the latching position causing the seal-carrier to be displaced inwards of the socket and the poppet valve to be unseated. In so doing the poppet valve enters the mouth of the nozzle and unseats from an internal seating in the extremity of the nozzle a valve plunger axially slidable in the nozzle and urged towards its seating by spring means.

The face of the nozzle valve plunger preferably bears a sealing ring which makes a fluid-tight joint on the seating in the nozzle extremity and extends radially inwards to provide a fluid-tight seating for the poppet valve of the socket.

On withdrawal of the nozzle both valves meet their seatings before the fluid-tight joint between the nozzle and seal-carrier is broken, and the seal-carrier, nozzle extremity, poppet valve and valve plunger are so shaped that the volume of the cavity bounded by them at the instant of valve-closure is as small as possible, so that the amount of fluid which can be trapped in this cavity and which will be spilled when separation of the coupling members is completed will be very small.

In order still further to improve the spill-proof character of the coupling, a further object of the invention comprises a special form of annular seal to be mounted on the seal-carrier for engagement by the extremity of the nozzle when inserted into the socket. This special form of annular seal is constituted by a thin annular tongue, of resiliently flexible material which projects from the face of the sleeve-like seal-carrier to a distance considerably exceeding its thickness, the flexibility of the material of such tongue being such that the latter cannot transmit sufficient force to displace the seal-carrier against the effort of the spring-loading to which the latter is subjected, until said tongue has been folded back onto the face of the seal-carrier.

In a preferred form of construction of the invention, the outward face (which is exposed when the coupling members are separated) of the valve plunger disposed in the nozzle is substantially flat and is slightly recessed within the terminal opening of the nozzle when the plunger is in contact with its seating on the inner face of said terminal opening, the rim of which thereby shrouds the valve plunger sufficiently to protect it from encountering some part of the socket member and thereby becoming unseated in the event of the nozzle being inserted in the socket misaligned or incorrectly centred.

The outward face (which is exposed when the coupling members are separated) of the poppet valve in the socket meber is preferably substantially flat and the poppet valve when seated on the seal-carrier is preferably so disposed that, when the nozzle has advanced far enough into the socket to fold down the flexible annular sealing tongue onto the seal-carrier face, the clearance between the flat faces of the poppet valve and nozzle valve plunger is as small as is practicable.

This ensures firstly that, on insertion of the nozzle, the nozzle-valve plunger cannot be unseated before the socket poppet valve, and likewise that, on withdrawal of the nozzle, the nozzle valve plunger also seats before the fluid-tight joint between the nozzle and socket opens, and further that, when both the poppet valve of the socket and the valve plunger of the nozzle valve have seated and before the fluid-tight joint between the nozzle and socket opens, there is no substantial cavity, in which fluid can be trapped and from which it would be spilled on the opening of the fluid-tight joint above mentioned.

A yet further object of the invention is to provide for at least approximate equalisation of the air pressure on the exposed face of the nozzle valve plunger and with that acting internally on the plunger and tending to seat it, when the nozzle is separated from the socket member, and more especially when the nozzle is mounted to face forwardly in an aircraft, in which case the exposed face of the plunger is subjected to considerable ram pressure; this object being achieved by providing an opening in the exposed face of the plunger communicating with the interior of the plunger and provided with a lightly spring-loaded non-return valve, which will only admit air from outside the plunger into the interior of the plunger, the end remote from the plunger face of the cavity formed by the interior of the plunger and a fixed housing in which it slides being vented to atmosphere—in an aircraft installation at a point not subject to ram pressure.

The opening with its non-return valve also serves as a relief to prevent any excessive build-up of pressure between the faces of the valve plunger and of the poppet valve of the socket member when the nozzle is inserted into the socket.

How these objects, and such others as may hereinafter appear, are to be achieved will be understood from the following description, which refers to the accompanying drawings, of two specific embodiments of the invention, said drawings and description being given by way of example only and without implied limitation of the scope of the invention, which is defined in the hereto appended claims.

In what follows the socket member of the complete coupling assembly illustrated in the drawings will be referred to for convenience as "the coupling," and the plug member of the coupling assembly will be referred to as "the nozzle." The coupling of Figures 1 to 4 comprises a shell 5 whose internal surface comprises several regions succeeding one another from the mouth end inwards and designated 5a to 5i, as follows: a conical flared mouth 5a, parallel portion 5b, a throat comprising a shallow female conical taper 5c, a female conical shoulder 5d and a parallel portion 5e, a further parallel portion of larger diameter 5f, a still further parallel portion of still larger diameter 5g, a shoulder 5h and in internal screw thread 5i. The coupling further comprises a slotted collar 6 having slots 6a, and a nut 7 having an external thread engaging the thread 5i of the shell 5. The collar 6 has an external flange engaging the shoulder 5h of the shell 5, and the joint between the collar flange, the shell and the nut 7 is sealed by means of a sealing ring 8. The inner surfaces of the collar 6 and nut 7 are formed with female spherical portions engaging a male spherical hollow ball fitting 9 which constitutes the terminal member of a hose or the like, not illustrated. The ball 9 and spherical parts of the collar 6 and 7 constitute a ball-and-socket joint by which the coupling is attached to the hose. This joint is sealed by means of sealing rings 10 mounted in internal circumferential grooves of the nut 7.

The coupling carries a number of latching devices adapted to engage and retain the nozzle when inserted into the coupling. These latching devices comprise latch levers 11 pivoted at 12 on lugs extending from the outside of the mouth part 5a of the shell 5, rollers 13 mounted on the levers 11 and spring-loaded plunger assemblies 14 pivotally connected to the levers 11 and pivoted at 15 on lugs extending from the rear part of the coupling shell 5. The coupling shell is slotted near the junction of the mouth part 5a and the parallel portion 5b to allow the latch rollers 13 to extend through the wall of the coupling shell to engage the nozzle when inserted into the coupling.

The mouth part 5a of the coupling shell is extended by means of a sheet metal cone 16 which serves as a guide for the nozzle when entering the coupling, and, when the apparatus is intended for flight refuelling, constitutes a drogue for applying drag to the end of a trailed hose or pipe on which the coupling is mounted, causing the hose to trail substantially horizontally.

Centrally located within the coupling shell is a poppet valve 17 pivotally suspended at 19 on three levers 18 (see also Figure 3) fulcrumed in the slots 6a of the slotted collar 6, for which purpose the levers have rounded enlargements which make rolling and sliding contact on the bottoms of the slots 6a and on cover plates 20 which are secured by studs 21 and close the open ends of the slots.

The parallel portions 5f and 5g of the coupling shell 5 form sliding bearings for a sleeve-like seal carrier 22 carrying an annular seal 23 secured by an annular retaining plate 24. The outer edge of this seal 23 seals the sliding joint between the seal carrier 22 and the parallel portion 5f of the coupling shell and the inner edge of the seal 23 provides a seating for the rear face of the rim of the poppet valve 17 (see Figure 2). It also provides a seating for the tip of the nozzle (see Figures 1 and 2) as hereinafter described.

In the seal carrier 22 is formed an internal circumferential groove 25 in which the outer extremities of the levers 18 engage, these extremities being formed with rounded surfaces to make rolling and sliding contact on the sides of the groove 25. The seal carrier is urged towards the mouth of the coupling shell, that is, towards the position shown in Figure 2, by a number of springs 26 retained in pockets of the slotted collar 6 and entering pockets of the seal carrier 22 (see Figure 4).

The nozzle comprises a nozzle shell 27 whose outer contour is composed of a number of regions succeeding one another from the root end towards the tip and designated 27a to 27g, as follows: a parallel portion 27a, a circumferential groove 27b whose radius corresponds to that of the latch rollers 13, a parallel portion 27c which is in effect a continuation of the parallel portion 27a, a tapered portion 27d in the form of a male cone having the same vertical angle as the conical taper 5c of the throat of the coupling shell, a male conical shoulder 27e of corresponding angle to the female conical shoulder 5d of the coupling shell, a parallel portion 27f and a rounded nose 27g. The parallel portions 27a, 27c and 27f respectively are clearance fits in the parallel portions 5b and 5e respectively of the coupling shell 5, the clearances being determined by the cumulative tolerances in the dimensions of the various parts of the nozzle and coupling.

Figure 1:
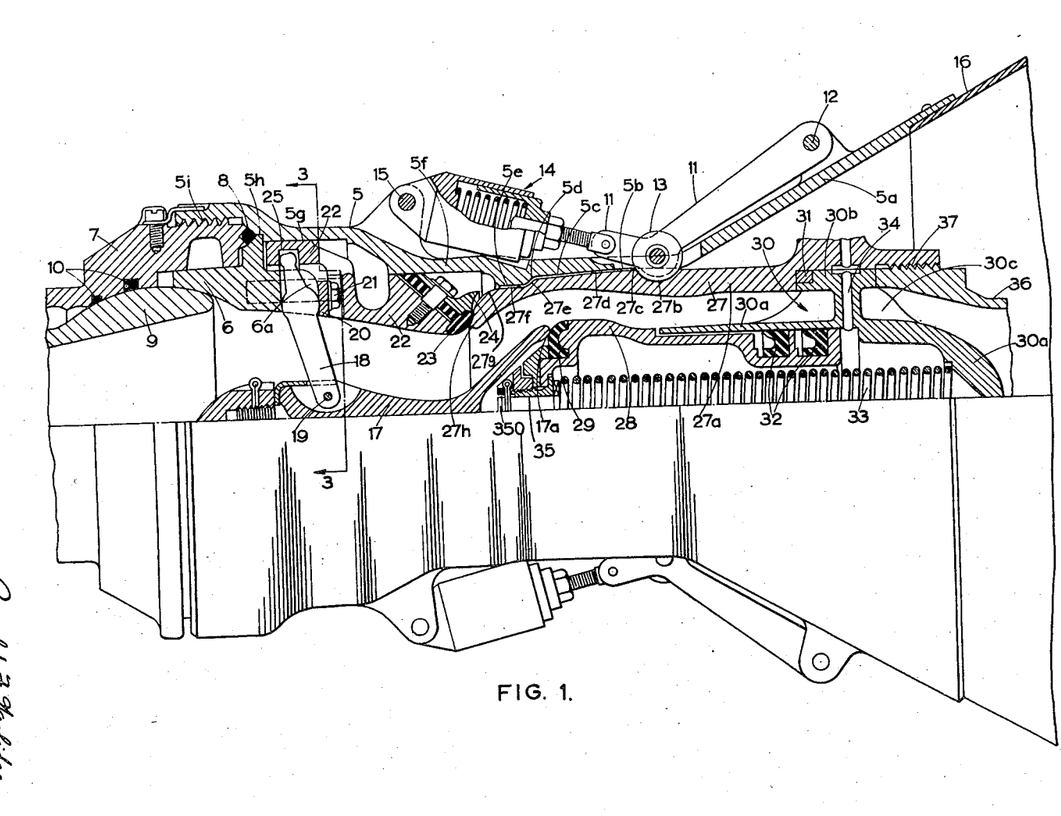
Figure 1 is a half axial section of one embodiment of the complete coupling in the engaged position with the valves open.
Figure 2:
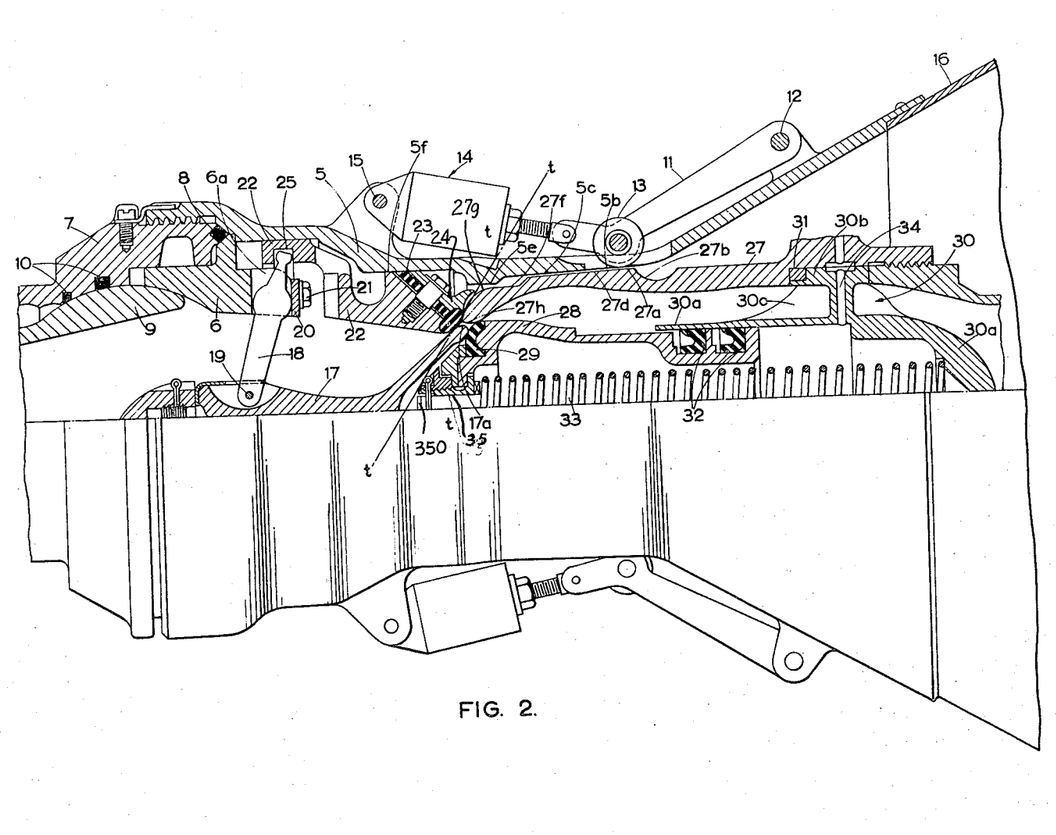
Figure 2 is a view similar to Figure 1 with the nozzle disengaged but just in contact with the annular seal of the socket, both valves being closed.
Figure 3:
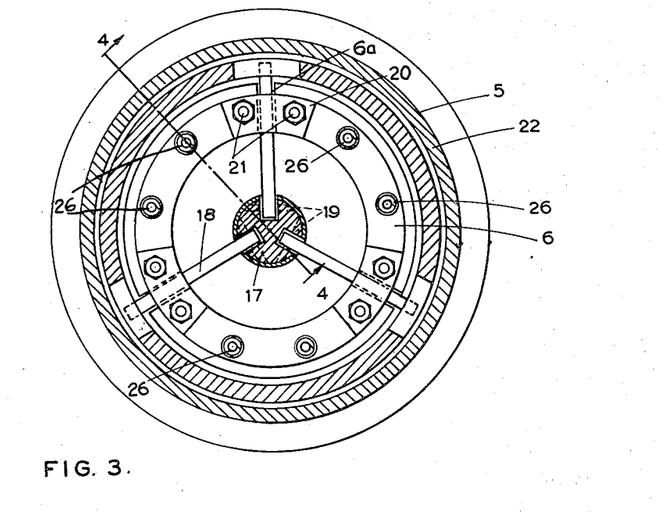
Figure 3 is a transverse section on the lines 3—3 of Figures 1 and 4.
Figure 4:
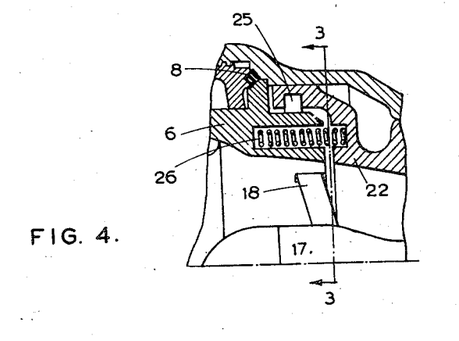
Figure 4 is a fragmentary section on the line 4—4 of Figure 3.

Centrally situated in the nozzle shell is a nozzle valve plunger 28 carrying a sealing ring 29 which seats against the inner face of the terminal opening of the nozzle shell 27 (see Figure 2) and also provides a seating for the outer face of the rim of the poppet valve 17 of the coupling (see Figures 1 and 2). The nozzle valve plunger is slidably supported in a spider 30 consisting of the following portions formed integrally, e. g. as a casting, viz. a hollow boss 30a, a sleeve 30b and radial webs 30c. The sleeve 30b is recessed into the nozzle shell 27, the joint being sealed by a sealing ring 31, and is secured against the end of a hollow nozzle-supporting-member 36 to which the nozzle shell is connected by a threaded joint 37. The spider boss 30a has a cylindrical bore in which the plunger 28 slides, the joint being sealed by U-section seal rings 32; and a nozzle valve spring 33 enclosed within and abutting on the spider boss 30a and within the hollow plunger 28 urges the latter outwards to seat in the terminal opening of the nozzle shell, as shown in Figure 2.

The interior of the nozzle valve plunger and spider boss is vented to atmosphere by means of a vent remote from the face of the plunger and constituted by a passage 34 passing through one of the spider webs 30c, the spider sleeve 30b and the nozzle shell 27. The plunger also has a vent at the extreme tip which may, if desired, be larger than the first mentioned vent and also covered by a gauze disc 350 to exclude ice and foreign matter from the interior of the plunger. When the plunger is seated on the rim of the coupling valve 17 the latter covers the vent 35, which is therefore inoperative and venting of the nozzle valve and the spider boss takes place through the rear vent 34. The functions of the vents 34 and 35 will be further described below.

When the nozzle is inserted into the coupling it is first approximately centred, if cut of line, by engagement of its tip with the flared mouth 5a of the coupling and as it advances is finally centralized and aligned by engagement of its parallel portions 27c and 27f with the corresponding parallel portions 5b and 5e of the coupling shell. As the nozzle advances its taper 27d engages the latch rollers 13 and springs the latches 11 outwards. When the nozzle has reached the position shown in Figure 2 the extreme tip of the nozzle shell seats on the outer part of the annular seal 23 of the coupling and the nozzle valve seal 29 meets the outer face of the rim of the coupling valve 17. Until this position is reached both the coupling valve and the nozzle valve are closed. As the nozzle continues to advance from this position, it presses back the seal carrier 22 against the springs 26 and thereby rocks the levers 18 to displace the coupling valve 17 axially towards the mouth of the coupling. This movement of the coupling valve causes it to pass through the opening of the nozzle shell and unseat the nozzle valve plunger 28, 29 from the opening of the nozzle shell by pressing it inwards against its spring 33. This movement continues until the latch rollers 13 engage the groove 27b of the nozzle (see Figure 1).

If the nozzle is inserted so forcibly as to tend to spring the groove 27b past the rollers 13 the shoulder 27e of the nozzle meets the mating shoulder 5d of the coupling shell before the clearance between the nozzle taper 27d and the taper 5c of the coupling is fully taken up, thus preventing the possibility of these tapers wedging together and at the same time ensuring that the annular seal 23 does not become crushed.

When the nozzle is withdrawn from the coupling, which is effected by applying sufficient tension to spring the latch rollers 13 out of the annular groove 27b, the springs 26 cause the seal carrier 22 to follow the nozzle in its withdrawal, at the same time, through the action of the levers 18, withdrawing the coupling valve 17 inwards; and the nozzle valve spring 33 causes the nozzle valve plunger 28 to follow this movement of the coupling valve 17. The seals between the nozzle shell and the annular seal 23 and between the nozzle valve plunger 28 and the coupling valve 17 are therefore maintained until the nozzle valve 17 seats on the annual seal 23 (see Figure 2). In this position both the coupling valve and the nozzle valve are closed and the only fluid that can be split as the nozzle is further withdrawn is the small amount trapped between the annular seal 23 and the nozzle valve seal 29 in the clearance between the rims of the nozzle shell opening and of the coupling valve 17. Some clearance must be provided between the rim of the coupling valve 17 and the opening of the nozzle shell 27 to enable the valve 17 to pass through the opening of the nozzle shell. Further, cumulative manufacturing tolerances permit a slight amount of misalignment or/and eccentricity between these parts, and to enable the valve 17 to pass easily through the nozzle opening in spite of such misalignment or/and eccentricity the valve rim and the nozzle opening are respectively formed with male and female chamfers 17a and 27h which inevitably increase the clearance between these parts when in the position shown in Figure 2, but even so the clearance is quite small and the amount of fluid that can be trapped in it is virtually negligible.

When the coupling contains fluid under pressure the seal carrier 22 experiences a force assisting the springs 26, and therefore tending to close the coupling valve, equal to the fluid pressure multiplied by the area, projected at right angles to the exis of the coupling, contained between the parallel portion 5f of the coupling shell and the line of contact between the annular seal 23 and the rim of the valve 17. At the same time the valve itself experiences a force tending to open it equal to the fluid pressure multiplied by the projected area within the line of contact between the rim of the valve 17 and the annular seal 23. These forces exert opposed moments about the fulcrums of the levers 18, which moments are proportional to the lengths of the inner and outer lever arms respectively, and the above-mentioned areas over which the fluid pressure acts are so proportioned that the moment of the valve-closing force exerted by the fluid pressure on the seal-carrier is superior to that of the valve-opening force exerted by the fluid pressure on the valve itself, so that the fluid pressure tends to keep the valve closed and to relieve the springs 26; and the greater the fluid pressure the more firmly is the coupling valve held on its seating when the nozzle is not in the coupling. In the example illustrated, the inner arm of the levers 18, connected to the valve, is twice as long as the outer arm connected to the seal-carrier 22 and consequently the effective projected area of the valve is made less than half the effective projected area of the seal-carrier.

When the nozzle is inserted in the coupling the fluid pressure assists the springs 26 to maintain the seal between the annular seal 23 and the tip of the nozzle shell 27. When the valves are open and the nozzle shell is filled with fluid under the operating pressure, the latter affords some relief to the nozzle valve spring 33 in seating the nozzle valve sealing ring 29 on the rim of the coupling valve 17, provided the diameter of the circle of contact between the nozzle valve sealing ring 29 and the coupling valve 17 exceeds that of the sliding seals 32. Since the interior of the nozzle valve plunger and spider boss 30a is vented to atmosphere through the passage 34, the spring-relieving force on the nozzle valve plunger is equal to the fluid pressure multiplied by the projected area within the line of contact between the coupling valve 17 and the nozzle valve sealing ring 29 less the projected area of the bore of the spider boss 30a in contact with the sliding seals 32.

The seating force between the annular seal 23 and the tip of the nozzle shell 27 tends to push the nozzle out of the coupling. This force is augmented by the force exerted by the fluid on the plunger 28 tending to push the valve 17 inwards, and is relieved by the force exerted by the fluid pressure on the valve 17 tending to push it outwards, the resultant of the two last-named, opposed forces reacting on the seal-carrier through the levers 18. It is therefore desirable to make the relieving force as large as possible and to minimise the augmenting force.

It can be shown that the resultant force exerted by the fluid-pressure on the nozzle shell tending to push it out of the coupling is given by $$\frac{\pi}{2}(D_1^2 - D_2^2 - r.D_3^2)p$$

where $p$ is the fluid pressure, $r$ the ratio of inner to the outer arms of levers 18, $D_1$ the diameter of portion 5f, $D_2$ the sealing diameter of the annular seal 23 on nozzle shell 27, and $D_3$ the diameter of the bore of the spider-boss 30a on seal rings 32. Since the springs 26 and 33 both tend to push the nozzle out of the coupling it is desirable to select the diameters $D_1$, $D_2$, $D_3$ so that the quantity in the bracket of the above expression is as small as possible, having regard to other requirements.

When the nozzle and coupling are intended for flight refuelling purposes and the nozzle is mounted on an aircraft in a forwardly facing position, the part of the nozzle valve plunger 28 exposed in the terminal opening of the nozzle shell 27 (when the nozzle is not engaged in the coupling) is subjected to the ram pressure due to the forward speed of the aircraft and tending to unseat the valve plunger against the effort of the nozzle valve spring 33. At high forward speeds this ram pressure becomes very considerable and it is this condition that determines the strength of the nozzle valve spring. It is to relieve the nozzle valve spring in this condition that the vent 35 is provided in the tip of the nozzle valve plunger enabling the pressure in the cavity enclosed by the plunger 28 and the spider boss 30a to build up to a value approaching the ram pressure and exerting on the nozzle valve plunger a force opposed to the external ram pressure and tending to seat the valve plunger, thus considerably relieving the effort required of the nozzle valve spring 33 to keep the valve plunger 28 on its seating.

The atmospheric vent 34 and the ram pressure relieving vent 35 may also be utilised for circulating hot air through the interior of the above-mentioned cavity for de-icing purposes, the hot air being pumped into the cavity through the vent 34 and exhausted through the vent 35.

It will be seen that the construction illustrated lends itself to easy and rapid disconnection of the coupling from the hose or the like to which it is attached and facilitates dismantling of the coupling. On unscrewing the nut 7 the coupling immediately comes away from the ball fitting 9 and the slotted collar 6, levers 18, seal carrier 22 and coupling valve 17 can be extracted from the coupling as a unit without unmaking any other fastenings.

Figure 5:
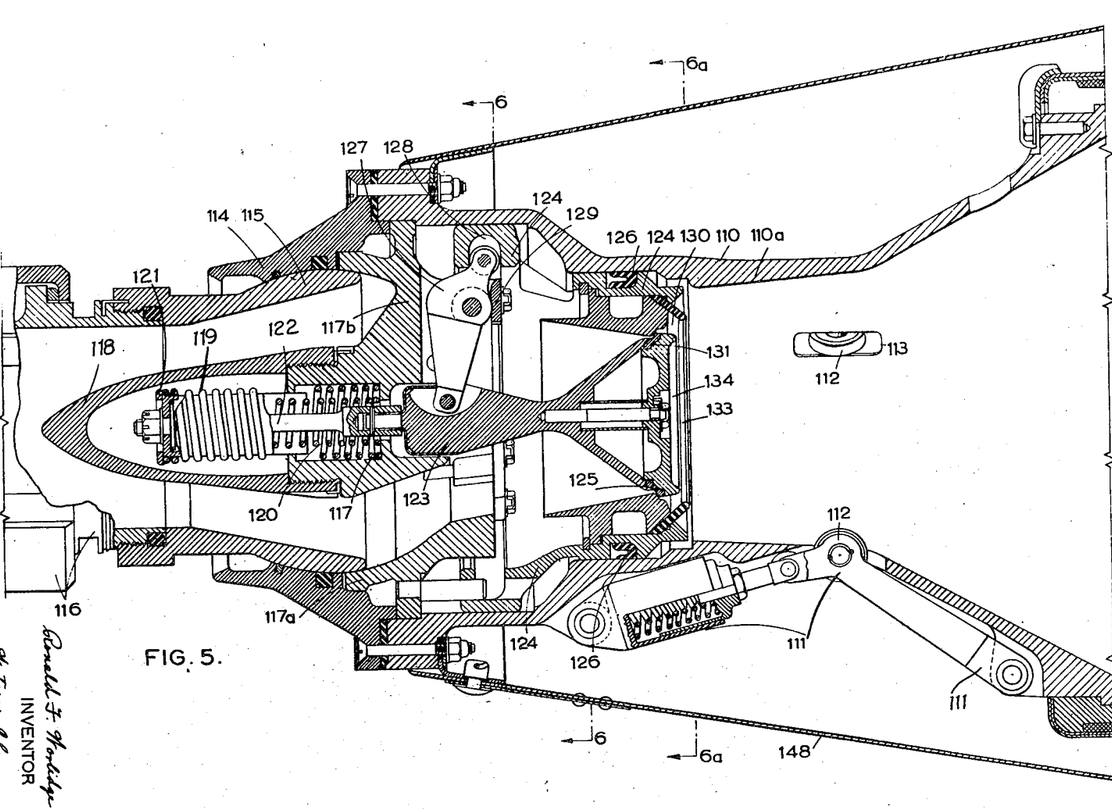
Figure 5 is an axial section of the socket component of a second embodiment of the coupling on the line 5—5 of Figure 6.
Figure 6:
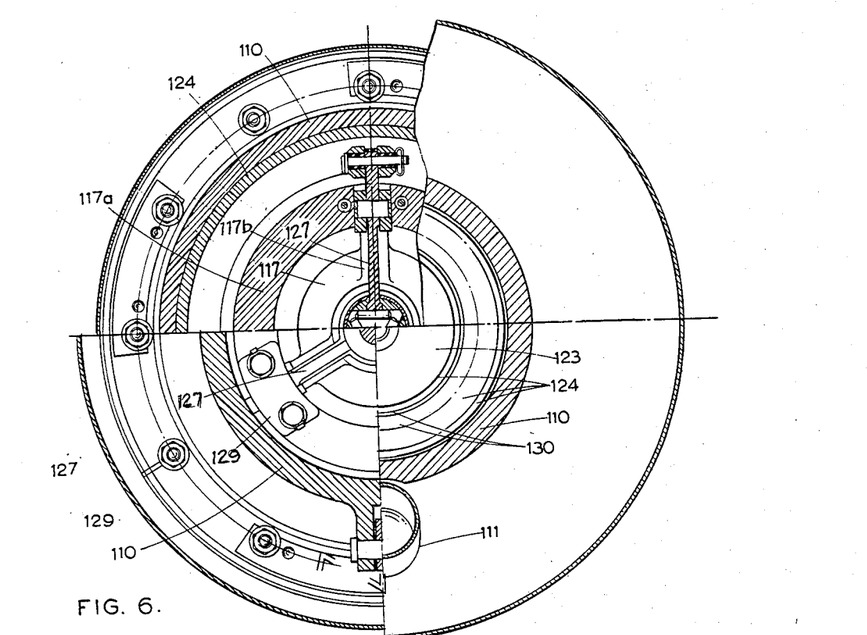
Figure 6 is a sectional view, whose left hand part is a half-section on the line 6—6 of Figure 5 and whose right hand part is a half-section on the line 6a—6a of Figure 5.

As in the example of Figures 1–4, the socket component of the pipe-coupling illustrated in Figures 5 and 6 comprises a socket body 110, having a throat 110a with a straight taper of small angle such that the diameter of the throat decreases towards the interior of the socket. As in Figures 1 and 2, the socket body is provided with externally mounted spring-loaded latching assemblies 111 carrying latch-rollers 112 which extend into the throat through slots 113. The body 110 is connected to a hose adaptor 116 by ball and socket joint members 114, 115. The body 110 and member 114 are secured to one another and positively locate a ring member 117a forming part of a spider which also comprises radial webs 117b and a central boss 117, which, together with a cap 118 screwed thereto forms a housing enclosing a nested pair of helical compression springs 119, 120. The right hand end (Figure 5) of these springs abuts on the boss 117 and their left hand end on a cap 121 secured to an extension 122 of the stem of a poppet valve 123, disposed coaxially in and axially displaceable in the socket.

Valve 123 seats on a seating furnished by the external face of a sleeve-like seal-carrier member 124, the valve being provided with a sealing ring 125 to ensure fluid-tight seating. Member 124 is disposed in the socket body 110 internally of the throat 110a and is slidable in the body 110, being provided with a U-section sealing ring 126 for ensuring fluid-tightness of the sliding joint.

The valve 123 and member 124 are interconnected by radially disposed levers 127, whose inner ends are pivotally connected to the valve 123 and whose outer ends engage an annular groove 128 in the left hand end (Figure 5) of the member 124, each lever being fulcrumed, at a point intermediate its ends, on a plate 129 secured to the ring member 117a which is slotted to accommodate the levers. As in the previously described example the levers thus ensure that axial displacements of the valve 123 and member 124 take place in opposed senses, and the springs 119, 120 tend to displace the valve to the left and the member 124 to the right (Figure 1), so as normally to seat the valve on the sleeve-like member, and thus to seal the interior part of the socket and a hose (not shown) to which it is attached by the hose adaptor.

The external face of the member 124 is further provided with an annular seal constituted by a thin annular tongue 130 of resiliently flexible material, extending from the face of member 124 obliquely towards the throat and towards the axis of the socket, its extension from the face of member 124 being considerably in excess of its thickness.

The socket is further provided with a funnel-shaped extension 147, which serves to guide the complementary nozzle into the socket, and an external fairing 148.

Figure 7:
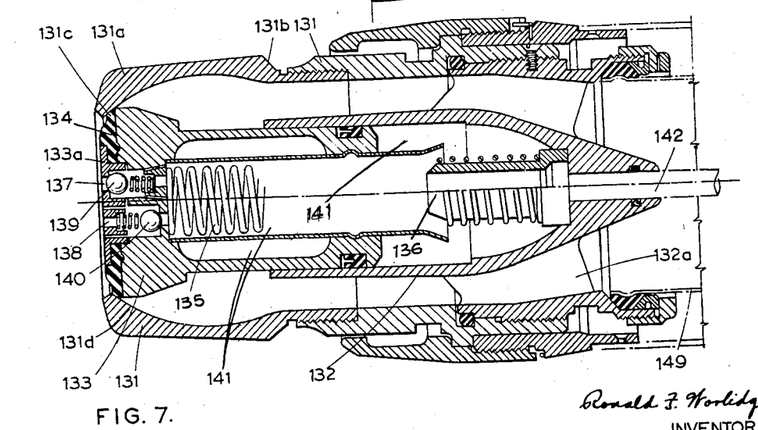
Figure 7 is an axial section of the nozzle component of the coupling of Figures 5 and 6.
Figure 8:
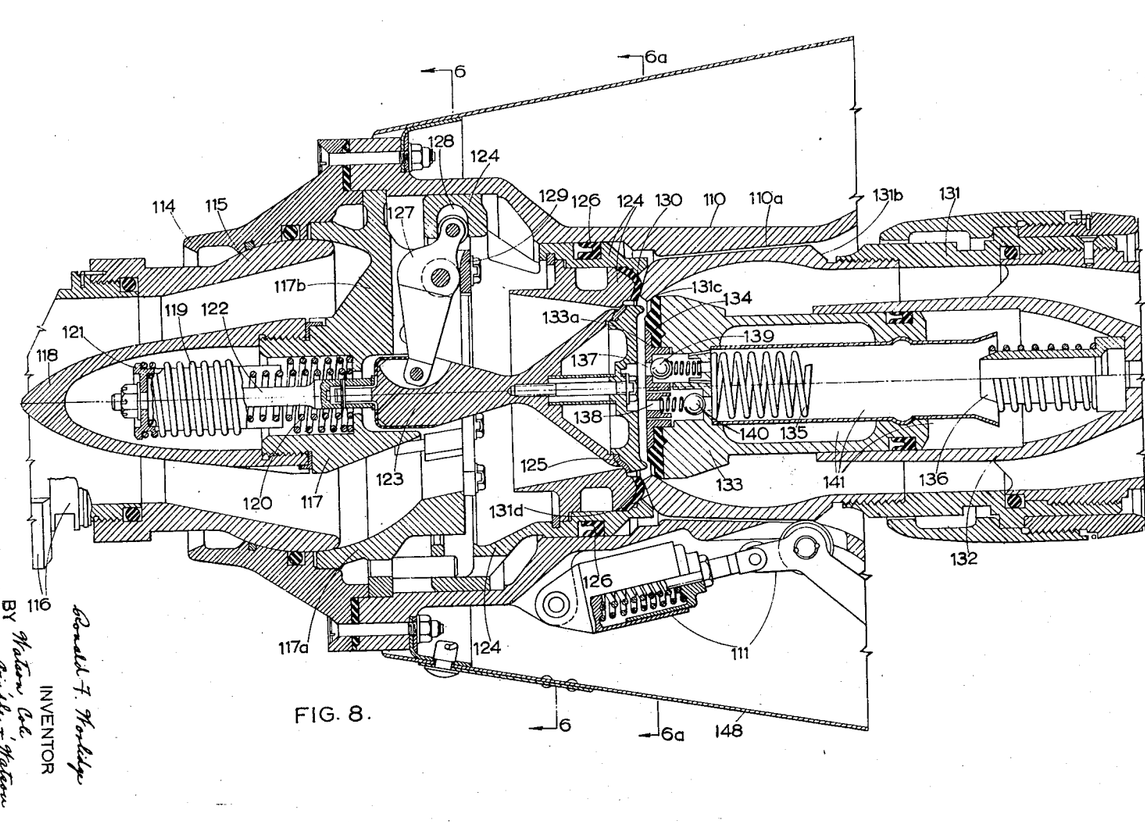
Figures 8 and 9 are fragmentary axial sections of the coupling of Figures 5 and 6 with the coupling members partially and fully engaged respectively.
Figures 9, 10:
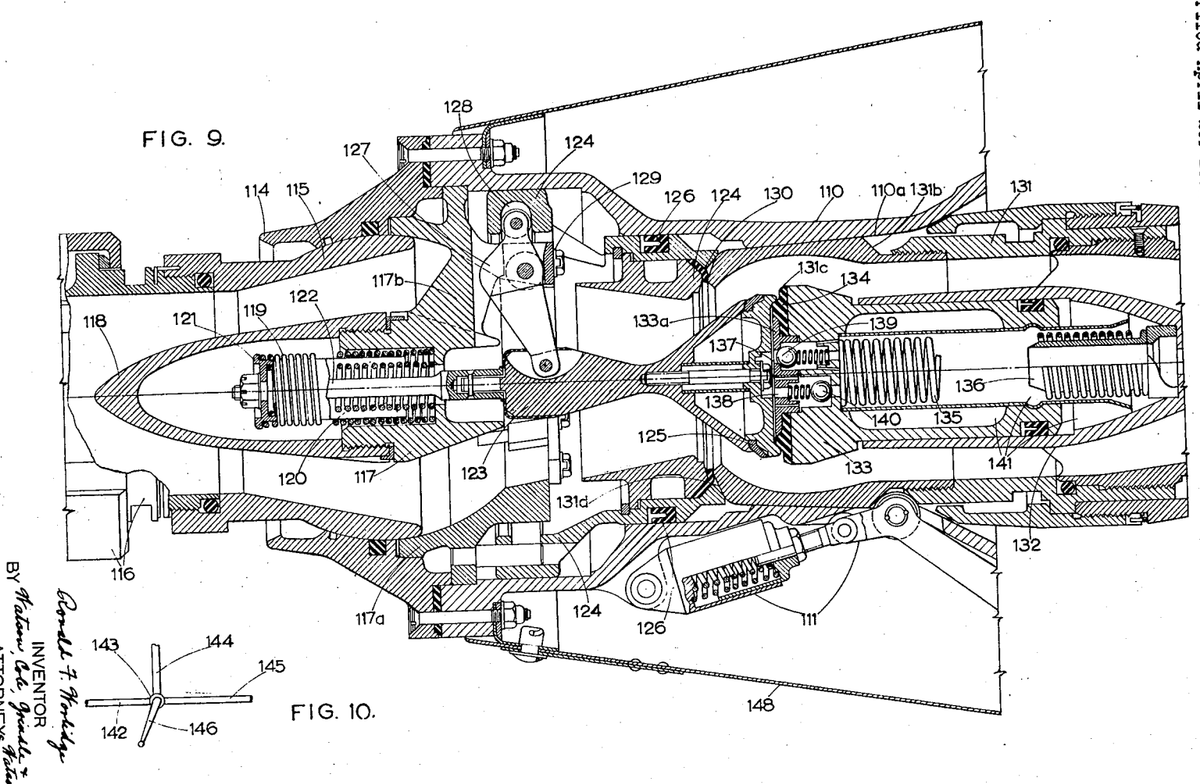
Figure 10 is a schematic representation of a detail.
Figure 11:
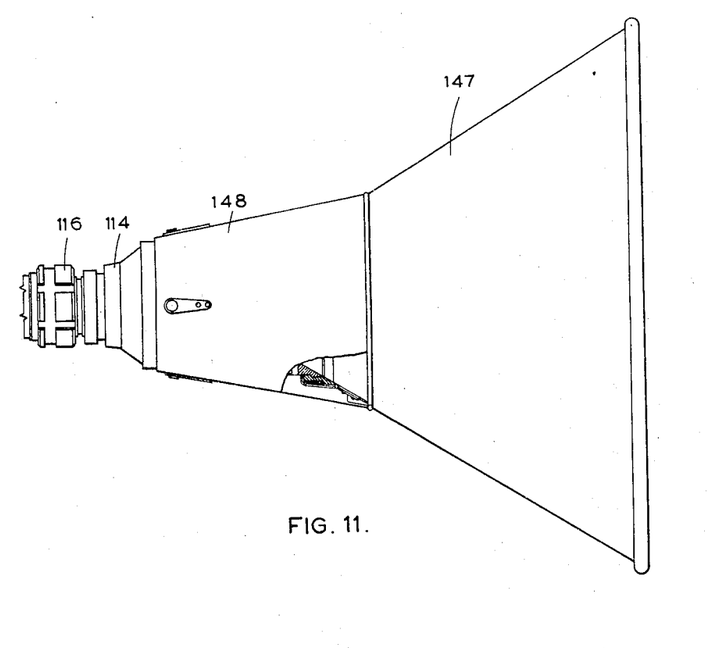
Figure 11 is a side elevation, partly sectioned, of the socket component of Figures 5 and 6, on a reduced scale.

As in the previously described example, the nozzle component of the coupling (Figure 7), which is connected in a fluid-tight manner with a pipe 149, comprises a shell 131 having a tapered part 131a, complementary to the tapered throat 110a of the socket, and a circumferential groove 131b adapted to be resiliently engaged by the latch-rollers 112 of the socket (see Figure 9). An internal hollow member 132, mounted rigidly and coaxially in the shell by means of radial webs 132a, constitutes a cylinder, in which a valve plunger 133 is supported and can slide in a fluid-tight manner coaxially of the shell, a helical compression spring 135 being trapped between the head of the plunger and an abutment shoulder formed on a hollow spring-centring spigot 136, which is lodged in a recess of the member 132. Spring 135 tends to displace the plunger 133 to the left (Figure 8) and normally causes it to seat on an internal seating 131c formed in the extremity 131d of the nozzle shell 131, the face of the plunger being provided with a sealing ring 134 which ensures fluid-tight seating of the plunger on said internal seating.

The sealing ring 134 extends radially inwards so as to be exposed in the terminal opening of the nozzle extremity 131d to provide a fluid-tight seating for the external face of the poppet valve 123 of the socket, when the latter makes contact with the face of the plunger 133 (see Figure 9). The sealing ring 134 is retained by a plunger face plate 133a, which is flat and flush with the sealing ring, and is slightly recessed within the terminal opening of the nozzle extremity 131d.

The latter feature ensures that if the nozzle is inserted incorrectly into the socket, for instance so as to foul the rim of the funnel-shaped guide 147, or otherwise out of correct alignment, the plunger cannot be unseated, since it is effectively shrouded by the rim of the terminal opening of the nozzle extremity.

As the nozzle advances into the socket its extremity 131d first meets the tip of the extended annular tongue constituting the annular seal 130, the flexibility of which is such that it cannot transmit to the member 124 sufficient force to displace it against the effort of springs 119, 120 applied through the levers 127, until it has been folded down onto the face of the member 124 by further advance of the nozzle, as shown in Figure 8, in which position an effective fluid-tight seal has been established between the nozzle extremity 131d and the member 124, the external faces of the nozzle extremity and of the member 124 having complementary profiles to ensure that the folded down seal 130 makes complete contact with both such faces. If the nozzle is misaligned when inserted it cannot reach the position of Figure 8 without having been substantially centred and straightened up, owing to the mutual proximity of the complementary tapers 110a and 131a in this position.

In this position, the flat face plate 133a of the nozzle valve plunger 133 is separated from the flat face of the socket poppet valve 123 so that the plunger is still seated; the poppet valve is likewise still seated on the member 124, since the latter has not yet moved from the position of Figure 5. The clearance between the plunger 133 and poppet valve 123 is, however, in this position as small as is practicable, for reasons explained hereinafter.

Since the seal between the nozzle extremity and the member 124 is fully effected before either valve can open, spillage of fluid on entry of the nozzle into the socket is prevented.

Further advance of the nozzle displaces the member 124 to the left and through the action of the levers 127 displaces the poppet valve 123 to the right, thus unseating the latter, against the effort of springs 119, 120. In this movement the face of the poppet valve first meets the face of the plunger and effects a fluid-tight seal with the sealing ring 134, and then displaces the plunger to the right against the effort of spring 135, thus unseating the plunger from its seating 131c on the inside of the nozzle extremity 131d (see Figure 9). The valves being open, fluid can now pass through the coupling.

On withdrawal of the nozzle, either intentionally or otherwise, the position of Figure 8 is first reached, in which both the poppet valve 123 and plunger 133 are seated, the seating of the latter taking place just before that of the former. At this stage the cavity represented by the clearance between the faces of the valve 123 and plunger 133 is necessarily filled with fluid.

As the withdrawal proceeds, the tongue constituting the annular seal 130 erects itself and not until it is fully erect is the seal between the member 124 and the nozzle extremity 131d broken, allowing the fluid trapped between the valve 123 and plunger 133 to escape.

It is to be observed that as the tongue 130 erects itself the clearance between the plunger 133 and valve 123 necessarily increases, but since both valves are already closed the fluid no longer has access to this clearance, so that by making the initial clearance, in the position of Figure 8, exceedingly small, the quantity of fluid spilled on withdrawal of the nozzle is rendered negligible.

The face 133a of the plunger 133, exposed on withdrawal of the nozzle from the socket, is provided with two openings 137, 138 provided with non-return valves 139, 140 which operate in opposed senses, valve 139 serving as an inlet to and valve 140 as an outlet from the cavity 141 of variable volume enclosed by the plunger 133 and plunger-supporting and -guiding member 132. The end of this cavity remote from the plunger face can be vented to atmosphere through a pipe 142. The inlet valve 139, being lightly-loaded, serves to equalise approximately the internal pressure in the cavity 141 with the external pressure on the plunger face, thus reducing the tendency for ram pressure to unseat the plunger when the nozzle is mounted in an aircraft in a forwardly facing position.

The pipe 142 is connected (Figure 10) to a cock 143 by which it can be put into communication either with an atmospheric vent pipe 144 or with a pipe 145 connected to a source (not shown) of de-icing fluid under sufficient pressure to open the lightly-loaded outlet valve 140, thus enabling such fluid to be distributed to the plunger face through the opening 138. The cock is remotely controlled, e. g. by a lever 146 and suitable mechanism (not shown) or electrically. Hot air or gas may be used for thermal de-icing instead of de-icing fluid, in which case the valve 140 enables a continuous flow of the hot air or gas through the plunger to be maintained for as long as may be necessary.

I claim:

1. A socket-like pipe-coupling member, said member comprising a shell having a throat, which is adapted to fit a complementary coupling nozzle, said nozzle being formed with latch engaging means, said member further comprising spring-loaded latches mounted on said shell and adapted to engage with said latch engaging means of the nozzle, levers medially fulcrumed in said shell, a poppet valve, a housing coaxially located in said shell and supporting said valve in the shell coaxially therewith for axial displacement therein and operatively engaged with the radially inner ends of the levers, a sleeve-like seal-carrier slidable coaxially in the shell and disposed axially inwards of the throat thereof and engaged by the radially outer ends of said levers, whereby axial displacements of said poppet valve and said seal-carrier relative to the shell take place in opposed senses, an annular seal coaxially supported by said carrier for operative seating engagement by said valve, and spring means urging said valve toward said seating engagement, said spring means similarly acting through said levers to urge said carrier toward said valve.

2. A socket-like pipe coupling member comprising a generally tubular shell, a sleeve-like seal carrier mounted in said shell for relative axial movement, the rear end of said carrier defining a fluid port, a poppet valve carried by said shell coaxially to and rearwardly of said carrier for seating and unseating in said port responsive to relative rearward and forward movement respectively of said carrier, spring means within said shell, and means linking said spring means to the carrier to urge said carrier rearwardly into seating relation with said valve, a rearwardly presented annular seal carried by said carrier around said port and said valve, said seal comprising a relatively thin frusto-conical shell of resiliently axially deflectible flexible material converging rearwardly for operative sealing engagement with a nozzle movable axially forwardly into thrusting engagement therewith around said valve to unseat said valve, the flexibility of the material forming said seal being so chosen that the resistance of said annular seal to axial thrust is substantially less than the thrust transmitted to the carrier from said spring means by the said means which link the spring means to the carrier, whereby said seal will be incapable of transmitting a valve unseating thrust to the carrier until the seal has been collapsed axially against said seal carrier.

3. The combination of claim 2 wherein said seal carrier is provided with a generally flat annular face between said port and said seal, for axial abutment with the seal in the axially collapsed condition thereof.

4. The combination of claim 2 including means mounting said valve in said shell for axial movement, and a linkage interconnecting said valve and said carrier for movement in opposite axial directions.

5. A socket-like pipe coupling member comprising a generally tubular shell, a sleeve-like seal carrier mounted in said shell for relative axial movement, the rear end of said carrier defining a fluid port, a poppet valve carried by said shell coaxially to and rearwardly of said carrier for seating and unseating in said port responsive to relative rearward and forward movement respectively of said carrier, spring means within said shell, and means linking said spring means to the carrier to urge said carrier rearwardly into seating relation with said valve, a rearwardly presented annular seal carried by said carrier around said port and said valve, said seal comprising a relatively thin frusto-conical shell of resiliently axially deflectible flexible material converging rearwardly, in combination with a nozzle guided by and insertible axially into said shell into thrusting operative engagement with said seal, said nozzle having an axial opening therein for communication with said port, said opening being proportioned and positioned for free reception of said valve, the flexibility of the material forming said seal being so chosen that the resistance of said seal to axial thrust is substantially less than the thrust transmitted to the carrier from said spring means by the said means which links the spring means to the carrier, whereby unseating of the valve will be delayed until the seal has been collapsed axially against said carrier.

References Cited in the file of this patent

UNITED STATES PATENTS

| | | |
|---|---|---|
| 2,307,427 | Smith et al. | Jan. 5, 1943 |
| 2,733,079 | Worlidge | Jan. 31, 1956 |